(12) United States Patent　(10) Patent No.: US 10,821,900 B2
Watanabe　(45) Date of Patent: Nov. 3, 2020

(54) IMAGE PROCESSING DEVICE

(71) Applicant: AISIN SEIKI KABUSHIKI KAISHA, Kariya (JP)

(72) Inventor: Kazuya Watanabe, Anjo (JP)

(73) Assignee: AISIN SEIKI KABUSHIKI KAISHA, Kariya (JP)

(*) Notice: Subject to any disclaimer, the term of this patent is extended or adjusted under 35 U.S.C. 154(b) by 0 days.

(21) Appl. No.: 16/257,279

(22) Filed: Jan. 25, 2019

(65) Prior Publication Data

US 2019/0232874 A1　Aug. 1, 2019

(30) Foreign Application Priority Data

Jan. 26, 2018　(JP) ................. 2018-011779

(51) Int. Cl.
| H04N 7/18 | (2006.01) |
| B60R 1/12 | (2006.01) |
| B60R 1/00 | (2006.01) |
| H04N 5/369 | (2011.01) |

(52) U.S. Cl.
CPC ............. B60R 1/12 (2013.01); B60R 1/00 (2013.01); B60R 1/002 (2013.01); B60R 1/006 (2013.01); H04N 7/181 (2013.01); B60R 2001/1253 (2013.01); B60R 2300/105 (2013.01); B60R 2300/30 (2013.01); B60R 2300/303 (2013.01); B60R 2300/607 (2013.01); B60R 2300/806 (2013.01); H04N 5/369 (2013.01)

(58) Field of Classification Search
CPC .. B60R 1/12; B60R 1/00; B60R 1/002; B60R 1/006; B60R 2001/1253; B60R 2300/105; B60R 2300/303; B60R 2300/607; B60R 2300/806; H04N 7/181; H04N 5/369
USPC ..................................................... 348/148
See application file for complete search history.

(56) References Cited

U.S. PATENT DOCUMENTS

| 2005/0201632 | A1 | 9/2005 | Sakakima | |
| 2010/0007734 | A1* | 1/2010 | Yamazaki | B60R 1/00 348/148 |
| 2013/0250114 | A1* | 9/2013 | Lu | H04N 5/23238 348/148 |

(Continued)

FOREIGN PATENT DOCUMENTS

| JP | 2006-50090 A | 2/2006 |
| JP | 4455364 B2 | 4/2010 |
| JP | 6156486 B2 | 7/2017 |

*Primary Examiner* — Jayanti K Patel
*Assistant Examiner* — Richard B Carter
(74) *Attorney, Agent, or Firm* — Sughrue Mion, PLLC

(57) ABSTRACT

An image processing device includes: an acquisition unit that acquires a first image based on captured image data output from an image capturing unit that captures a surrounding situation of a vehicle; an intermediate image generating unit that generates a second image by executing an intermediate image generating process of executing a viewpoint converting process of converting the first image from a viewpoint of the first image into a viewpoint of a final image displayed on a display area of a display device and changing a number of pixels of the converted image to a second number of pixels larger than a final number of pixels of the final image; and a final image generating unit that executes a reduction process such that the second number of pixels is set to the final number of pixels.

4 Claims, 4 Drawing Sheets

(56) References Cited

U.S. PATENT DOCUMENTS

| | | | |
|---|---|---|---|
| 2014/0168440 A1* | 6/2014 | Tsuchiya | B60R 1/00 348/148 |
| 2015/0332441 A1* | 11/2015 | Hogasten | H04N 5/2257 348/148 |
| 2016/0035110 A1* | 2/2016 | Kiyota | B60R 1/00 348/148 |
| 2018/0201191 A1 | 7/2018 | Nakasho et al. | |

* cited by examiner

IMAGE PROCESSING DEVICE

CROSS REFERENCE TO RELATED APPLICATIONS

This application is based on and claims priority under 35 U.S.C. § 119 to Japanese Patent Application 2018-011779, filed on Jan. 26, 2018, the entire contents of which are incorporated herein by reference.

TECHNICAL FIELD

Embodiments of this disclosure relate to an image processing device.

BACKGROUND DISCUSSION

In the related art, when an image is displayed on a display device based on captured image data captured by an imaging device (a camera), it is necessary to reduce the size of the image to a size suitable for a display area of the display device. In such a case, for example, an image processing technique such as bilinear interpolation can be used. However, it is known that when the bilinear interpolation or the like is executed, if the image is reduced to be 50% or less of an original size thereof, pixel omission or the like occurs, and thus image quality deteriorates. Therefore, for example, a technique has been proposed which, when the bilinear interpolation or the like is used, generates an image having a desired size (the number of pixels) by executing a reduction process a plural times such that a reduction ratio does not become 50% or less.

In recent year, the number of vehicles equipped with in-vehicle cameras has increased, and the number of cases where captured images are sequentially displayed on a vehicle-mounted display device has increased. When an image is displayed on a vehicle, various processing is performed not only to display a captured image but also to allow a driver to easily identify a situation around the vehicle. For example, a part of an image, which a user wants to focus on, is mainly displayed or a bird's-eye view image obtained by bird's-eye viewing an entire circumference of the vehicle is displayed. At this time, since the size of a display area of an in-vehicle display device is limited, the size (the number of pixels) of a part of the captured image may be reduced to 50% or less thereof. Therefore, it is meaningful if it is possible to provide an image processing device that provides a high-quality reduced image by more quickly processing an image captured by the in-vehicle camera under a light load using a limited processing capacity of an in-vehicle device.

SUMMARY

An image processing device according to an embodiment of this disclosure includes an acquisition unit that acquires a first image based on captured image data output from an image capturing unit that captures a surrounding situation of a vehicle, an intermediate image generating unit that generates a second image by executing an intermediate image generating process of executing a viewpoint converting process of converting the first image from a viewpoint of the first image into a viewpoint of a final image displayed on a display area of a display device and changing a number of pixels of the converted image to a second number of pixels that is larger than a final number of pixels of the final image, and a final image generating unit that executes a reduction process such that the second number of pixels of the second image is set to the final number of pixels of the final image. For example, when the viewpoint converting process is performed on an image captured by the image capturing unit, a reduction rate of a portion close to the image capturing unit tends to be smaller than a portion far from the image capturing unit. However, with this configuration, for example, a second image having the second number of pixels that is larger than the final number of pixels of the final image displayed on the display device is generated in a step of applying the viewpoint converting process. That is, since the viewpoint conversion is performed in a step in which a reduction ratio is high and the size (the number of pixels) is relatively large, it is difficult for an excessively reduced portion (for example, a pixel omitted portion) inside the image to occur. Further, in this state, since the number of pixels is reduced to the final number of pixels, the entire second image can be quickly and uniformly reduced with a light load, so that partial variations in image quality are suppressed, and the final image having reduced degradation of image quality and suitable for display can be generated.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, exemplary embodiments disclosed here are disclosed. A configuration of the embodiments described below and an action, a result, and an effect obtained by the configuration are examples. This disclosure can be realized by a configuration other than the configuration disclosed in the following embodiments, and can obtain at least one of various effects and derived effects based on a basic configuration.

Figure 1:
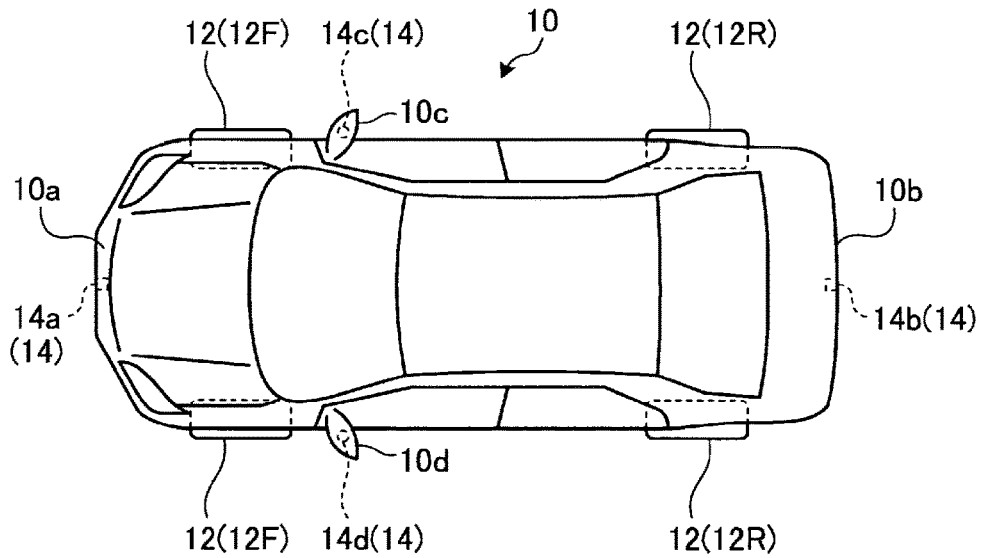
FIG. 1 is a plan view schematically illustrating an example of a vehicle on which an image processing device according to an embodiment can be mounted.

FIG. 1 is a plan view schematically illustrating a vehicle 10 on which an image processing device according to the present embodiment is mounted. The vehicle 10 may be a vehicle (an internal combustion engine vehicle) using an internal combustion engine (an engine, not illustrated) as a driving source, may be a vehicle (an electric vehicle, a fuel cell vehicle, and the like) using an electric motor (a motor, not illustrated) as a driving source, and may be a vehicle (a hybrid vehicle) using both the engine and the motor as a driving source. Further, the vehicle 10 can have various transmissions mounted thereon, and can have various devices (a system, a component, and the like) mounted thereon and necessary for driving an internal combustion engine and an electric motor. Further, the type, the number, the layout, and the like of devices related to driving of wheels 12 (front wheels 12F and rear wheels 12R) of the vehicle 10 can be variously set.

As illustrated in FIG. 1, for example, four image capturing units 14a to 14d as a plurality of image capturing units 14 are provided in the vehicle 10. The image capturing units 14 are, for example, digital cameras having imaging elements embedded therein, such as a charge coupled device (CCD) and a CMOS image sensor (CIS). The image capturing units 14 can output moving image data (captured image data) at a predetermined frame rate. Each of the image capturing units 14 can have a wide angle lens or a fisheye lens, and can perform imaging in a range of, for example, 140 degrees to 220 degrees, in a horizontal direction. Further, in some cases, an optical axis of the image capturing unit 14 may be set obliquely downward. Therefore, the image capturing unit 14 outputs captured image data obtained by successively photographing a surrounding environment outside the vehicle 10, including a road surface on which the vehicle 10 is movable, a mark (including an arrow, a mark line, a line indicating a parking space, a lane separation line, and the like) attached to the road surface, and an object (for example, a pedestrian, a vehicle, and the like as an obstacle).

The image capturing unit 14 is provided on an outer peripheral portion of the vehicle 10. For example, the image capturing unit 14a is provided on a front side of the vehicle 10, that is, at an approximately central portion of the vehicle 10 in a vehicle width direction on a front side of the vehicle 10 in a front-rear direction, for example, at a front bumper 10a, a front grill, or the like, and can capture a front image including a front end portion (for example, the front bumper 10a) of the vehicle 10. Further, for example, the image capturing unit 14b is provided on a rear side of the vehicle 10, that is, at an approximately central portion of the vehicle 10 in the vehicle width direction on a rear side of the vehicle 10 in a front-rear direction, for example, above a rear bumper 10b, and can capture a rear image including a rear end portion (for example, the rear bumper 10b) of the vehicle 10. Further, for example, the image capturing unit 14c is provided at a right end portion of the vehicle 10, for example, a right door mirror 10c, and can capture a right image including an area (for example, an area from a right front side to a right rear side) centered on a right side of the vehicle 10. Further, for example, the image capturing unit 14d is provided at a left end portion of the vehicle 10, for example, a left door mirror 10d, and can capture a left image including an area (for example, an area from a left front side to a left rear side) centered on a left side of the vehicle 10.

Arithmetic processing or image processing is executed based on the captured image data obtained by the plurality of image capturing units 14, so that an image having a wider viewing angle can be generated, and a virtual image (a bird's eye view image (a planar image), a lateral view image, a front view image, or the like) obtained by viewing the vehicle 10 from the upper side, the front side, the lateral side, or the like. Overlapping areas overlapping each other may be provided in the captured image data (the image) captured by each image capturing unit 14. For example, a right end portion of the captured image data captured by the image capturing unit 14a and a front end portion of the captured image data captured by the image capturing unit 14c overlap each other. Thus, when two images are connected (synthesized), blending processing may be executed in which a % of the captured image data of the front image and a % of the captured image data of the right image are synthesized. As the blending processing is executed, the front image and the right image are synthesized while being changed gradually, so that a boundary line caused by a difference in brightness and color can be made inconspicuous. Likewise, the blending processing is performed between the front image and the left image, between the left image and the rear image, and between the rear image and the right image, so that a boundary line in the entire synthesized peripheral image can be made inconspicuous.

Figure 2:
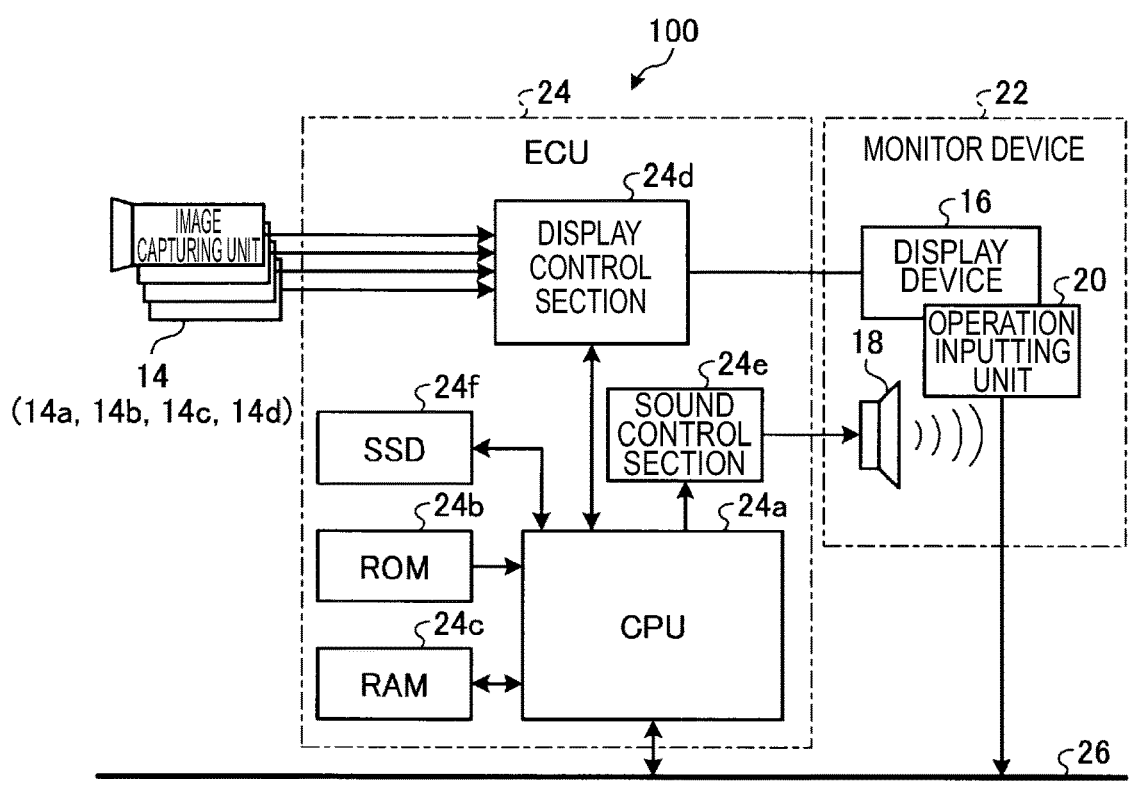
FIG. 2 is an exemplary block diagram illustrating a configuration of an image processing system including the image processing device according to the embodiment.

FIG. 2 is an exemplary block diagram illustrating a configuration of an image processing system 100 mounted on the vehicle 10 and including an image processing device. A display device 16 and a sound outputting device 18 are provided in a vehicular interior of the vehicle 10. The display device 16 is, for example, a liquid crystal display (LCD), an organic electroluminescent display (OELD), or the like. The sound outputting device 18 is, for example, a speaker. Further, the display device 16 is covered with a transparent operation inputting unit 20 such as a touch panel. An occupant (for example, a driver) can visually recognize an image displayed on a display screen of the display device 16 through the operation inputting unit 20. Further, the occupant can execute an operation input by an operation of touching, pressing, or moving the operation inputting unit 20 using a finger or the like at a position corresponding to the image displayed on the display screen of the display device 16. The display device 16, the sound outputting device 18, the operation inputting unit 20, and the like are provided, for example, in a monitor device 22 positioned at a central portion in the vehicle width direction, that is, the left-right direction of a dashboard of the vehicle 10. The monitor device 22 may have a not illustrated operation inputting unit such as a switch, a dial, a joystick, and a push button. The monitor device 22 may also be used as, for example, a navigation system or an audio system.

Further, as illustrated in FIG. 2, the image processing system 100 (the image processing device) includes an electronic control unit (ECU) 24 in addition to the image capturing units 14 (14a to 14d) and the monitor device 22. In the image processing system 100 (the image processing device), the ECU 24 and the monitor device 22 are electrically connected to each other through an in-vehicle network 26 as a telecommunication line. The in-vehicle network 26 is configured as, for example, a controller area network (CAN). The ECU 24 can execute control of various systems by transmitting a control signal through the in-vehicle network 26. Further, the ECU 24 can receive operation signals of the operation inputting unit 20 and various switches, detection signals of various not-illustrated sensors, and the like through the in-vehicle network 26.

The ECU 24 transmits, to the monitor device 22, data related to surrounding images and sounds generated based on the captured image data acquired from the image capturing units 14. The ECU 24 has, for example, a central processing unit (CPU) 24a, a read-only memory (ROM) 24b, a random access memory (RAM) 24c, a display control section 24d, a sound control section 24e, a solid state drive (SSD, a flash memory) 24f, and the like.

The CPU 24a reads a program stored (installed) in a nonvolatile storage device such as the ROM 24b, and executes the arithmetic processing according to the program.

Figure 3:
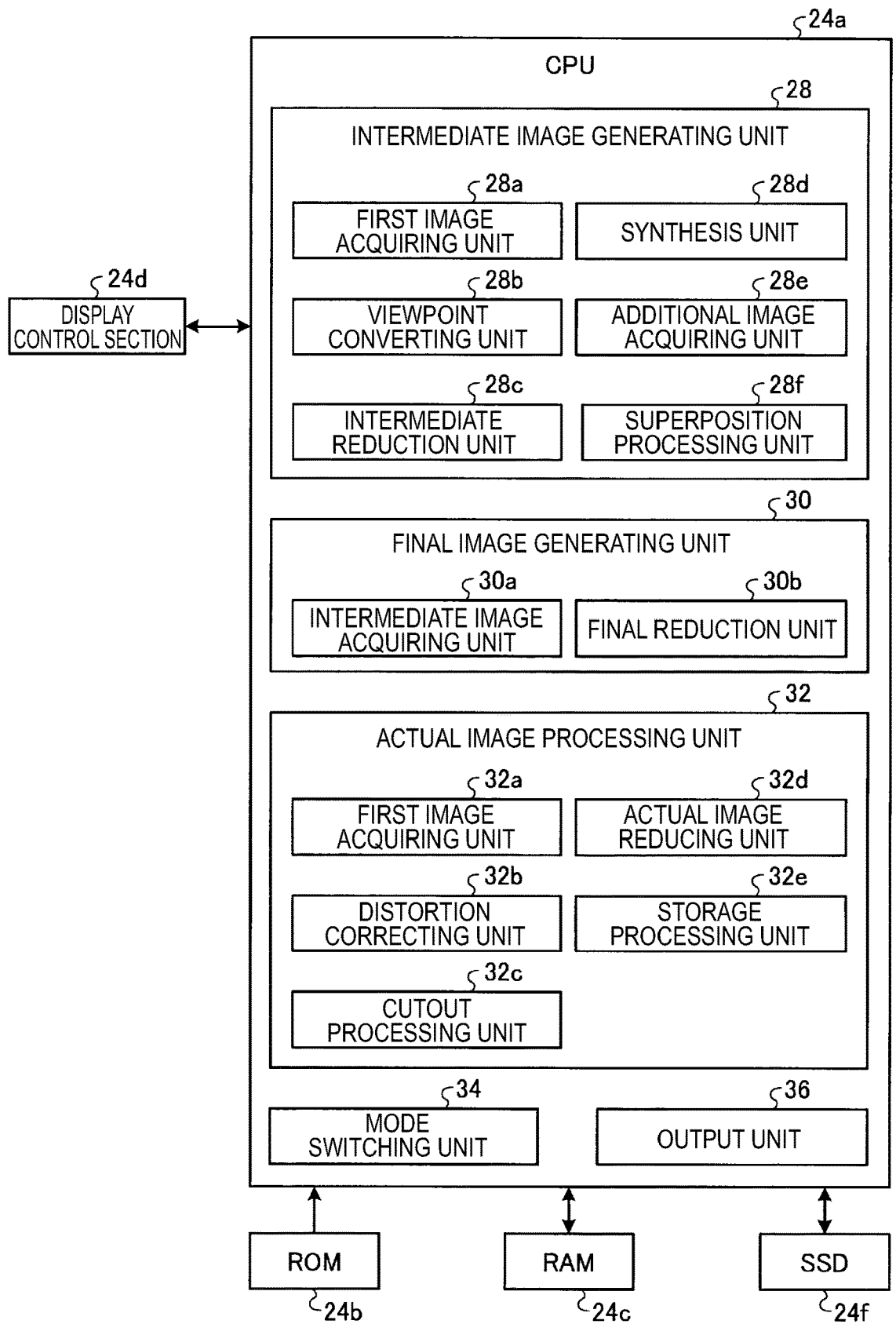
FIG. 3 is an exemplary block diagram illustrating a configuration of a central processing unit (CPU) of the image processing device according to the embodiment.

The ROM 24b stores a program and a parameter necessary for executing the program. The CPU 24a includes, for example, various modules as illustrated in FIG. 3, and executes processing related to an image displayed on the display device 16. For example, the CPU 24a executes correction processing, the arithmetic processing, the image processing, and the like on the captured image data captured by the image capturing units 14 to generate a peripheral image (for example, the bird's eye view image) obtained by joining a plurality of images. The CPU 24a will be described below in detail.

The RAM 24c temporarily stores various kinds of data used for calculation in the CPU 24a. Further, the display control section 24d mainly executes data conversion of a display image displayed on the display device 16 during the arithmetic processing in the ECU 24. The display control section 24d may include a capture unit that acquires an image while the number of pixels of the captured image data captured by the image capturing units 14 is maintained (while an original image quality is maintained) or acquires an image while the captured image data is sequentially reduced to a predetermined size. Therefore, the display control section 24d functions as an "acquisition unit" of the image. The display control section 24d is advantageous in a case where the image is acquired while the original image quality is maintained and in a case where the captured image data is used when processing such as pattern recognition and shape recognition is performed. Further, when the captured image data is reduced, the display control section 24d can perform the reduction at a reduction rate of 50% or more, thereby suppressing or reducing degradation of image quality due to the pixel omission during a capturing process. The capture unit may be configured with hardware or software. When the capture unit is configured with the hardware, a speed at which the image is captured and reduced can be improved and a load of the ECU 24 can be reduced, as compared to a case where the capture unit is configured with the software. Further, the sound control section 24e mainly executes processing of voice data outputted from the sound outputting device 18 during the arithmetic processing in the ECU 24. The SSD 24f, which is a rewritable nonvolatile storage unit, can store data even when the ECU 24 is switched off. The CPU 24a, the ROM 24b, the RAM 24c, and the like can be integrated in the same package. Further, the ECU 24 may be configured to use another logical operation processor such as a digital signal processor (DSP), a logic circuit, or the like instead of the CPU 24a. Further, a hard disk drive (HDD) may be provided instead of the SSD 24f, and the SSD 24f and the HDD may be provided separately from the ECU 24.

In the present embodiment, the ECU 24 manages image generating processing of an image displayed on the display device 16 through cooperation of the hardware and the software (a control program). When image processing, for example, viewpoint conversion processing and the like is performed on the captured image data (the image) captured by the image capturing units 14 and the captured image data is displayed on the display device 16, while the size (the number of pixels) of the image captured by the image capturing units 14 is reduced to a size at which the image can be displayed on the display device 16, the ECU 24 converts a display form such that the image becomes image information that is useful when the vehicle 10 is driven. For example, the ECU 24 can realize a viewpoint conversion image display mode in which the captured image data captured by the plurality of image capturing units 14 is synthesized and is converted into a bird's-eye view image and the converted bird's-eye view image is displayed on the display device 16. The ECU 24 can provide an actual image display mode in which the viewpoint conversion processing is not performed, the captured image data captured by the image capturing units 14 is displayed on the display device 16 as it is or the captured image data goes through distortion correction or cutout processing and reduction processing and is displayed on the display device 16.

FIG. 3 is an exemplary block diagram illustrating a configuration of the CPU 24a included in the ECU 24. The CPU 24a includes various modules for executing the above-described image processing. The various modules are realized as the CPU 24a reads and executes a program installed and stored in a storage device such as the ROM 24b. For example, as illustrated in FIG. 3, the CPU 24a includes modules such as an intermediate image generating unit 28, a final image generating unit 30, an actual image processing unit 32, a mode switching unit 34, and an output unit 36. Further, the intermediate image generating unit 28 includes a first image acquiring unit 28a, a viewpoint converting unit 28b, an intermediate reduction unit 28c, a synthesis unit 28d, an additional image acquiring unit 28e, and a superposition processing unit 28f. Further, the final image generating unit 30 includes an intermediate image acquiring unit 30a, a final reduction unit 30b, and the like. The actual image processing unit 32 includes a first image acquiring unit 32a, a distortion correcting unit 32b, a cutout processing unit 32c, an actual image reducing unit 32d, a storage processing unit 32e, and the like.

The intermediate image generating unit 28 generates, for example, an intermediate image necessary for displaying the bird's-eye view image of which a viewpoint is converted and which is obtained by bird's-eye viewing surroundings of the vehicle 10 as a final image to be displayed on a display area of the display device 16 with respect to a first image output by the image capturing units 14 and captured by the display control section 24d. The intermediate image is a second image obtained by converting a viewpoint thereof from a viewpoint of the first image to a viewpoint that is the same as a viewpoint of the final image displayed on the display area of the display device 16 by applying a viewpoint converting process to the first image, and by performing an intermediate image generating process such that the second number of pixels is more than the final number of pixels of the final image. Further, the intermediate image may be obtained by executing a process of causing various additional images to be superimposed with each other. Therefore, the intermediate image generating unit 28 generates an image of which the number of pixels is larger than the final number of pixels of the final image at the same viewpoint as the final image displayed on the display device 16. The final image is an image displayed on the display area of the display device 16 after the reduction process is performed. Further, the final number of pixels is the number of pixels of the final image that is displayed on the display device 16.

The final image generating unit 30 executes a process for generating the final image to be displayed in the display area of the display device 16 based on the second image generated by the intermediate image generating unit 28.

The actual image processing unit 32 executes a process of displaying the captured image data captured by the image capturing units 14 on the display device 16 or temporarily storing the captured image data as data to be used in separate image processing, without performing the viewpoint conversion process on the captured image data.

The mode switching unit 34 switches a display mode, based on an operation of the operation inputting unit 20, when the image is displayed based on the captured image data captured by the image capturing units 14 on the display device 16. For example, switching between a display mode in which the final image of which a viewpoint is converted by the final image generating unit 30 and the actual image processed by the actual image processing unit 32 are displayed, a display mode in which only the actual image processed by the actual image processing unit 32 is displayed, a display mode in which a navigation screen, an audio screen, and the like are displayed as a normal screen, and the like is performed.

The output unit 36 outputs, to the display control section 24*d*, the final image which is generated by the final image generating unit 30 and of which the viewpoint is converted by the final image generating unit 30, the actual image processed by the actual image processing unit 32, and the like, and displays the final image, the actual image, and the like on the display device 16.

The first image acquiring unit 28*a* of the intermediate image generating unit 28 sequentially acquires the captured image data of each image capturing unit 14, which is obtained by the display control section 24*d*, as a first image. As described above, for example, the display control section 24*d* can capture an image in a state (an original image-quality state) in which the number of pixels of the captured image data captured by the image capturing units 14 is maintained or can capture an image while the number of pixels of the captured image data is sequentially reduced to a predetermined size. It is assumed that when, for example, the bird's-eye view image obtained by bird's-eye viewing the surroundings of the vehicle 10 is displayed as the final image on the in-vehicle display device 16, the first image acquiring unit 28*a* of the intermediate image generating unit 28 reduces and synthesizes the captured image data captured by the image capturing units 14. Therefore, the first image acquiring unit 28*a* sequentially acquires the captured image data obtained by the display control section 24*d* at a predetermined reduction rate, for example, a reduction rate of 50% or more. The reduction rate when the display control section 24*d* performs the capturing can be appropriately determined based on a reduction processing capacity of the intermediate image generating unit 28, a difference between the number of pixels of images captured by the image capturing units 14 and the final number of pixels of the final image, and the like.

The viewpoint converting unit 28*b* and the intermediate reduction unit 28*c* cooperate with each other to generate the second image of which the viewpoint is converted and which has the second number of pixels, the second number of pixels being more than the final number of pixels of the final image displayed in the display area of the display device 16, with respect to the first image acquired by the first image acquiring unit 28*a*. When a viewpoint of an image (an actual picture) based on the captured image data captured by the image capturing units 14 is converted by the viewpoint converting unit 28*b*, in the captured image data captured by the image capturing units 14, the reduction ratio tends to become smaller in a portion close to the image capturing units 14 than in a portion far from the image capturing units 14. However, since reduction performed by the intermediate reduction unit 28*c* is performed under restriction that "an image having pixels of which the number is more than the final number of pixels of the final image", reduction processing having an extremely small reduction ratio can be prevented from being performed, and a part of the first image, for example, a portion of the first image, close to the image capturing units 14, can be prevented from being excessively reduced. That is, the degradation of the image quality due to the pixel omission or the like in a step of generating the second image can be suppressed. For example, when grating or the like exists in a portion close to the image capturing units 14, eyes of the grating when the pixel omission occurs becomes rough, and thus an image having unnaturalness is obtained. However, such inconvenience can be suppressed.

The viewpoint converting unit 28*b* converts a viewpoint of each image (the first image) based on the captured image data captured by each image capturing unit 14, and, for example, converts the image to a bird's-eye view image bird's-eye-viewed from a virtual viewpoint above the vehicle 10. The viewpoint converting unit 28*b* can appropriately set a position of the virtual viewpoint. For example, when the final image displayed on the display device 16 faces the vehicle 10 from a front side of the vehicle 10, the position of the virtual viewpoint is set to the front position of the vehicle 10. Likewise, the position of the virtual viewpoint can be switched to face the vehicle 10 from a rear side or a lateral side of the vehicle 10. Furthermore, for example, the virtual viewpoint may be set to face the outside of the vehicle 10 from the vehicle 10 such that a landscape viewed from a driver's seat at the position of the vehicle 10 when the vehicle 10 moves by a predetermined distance is set as the final image.

Further, the intermediate reduction unit 28*c* may perform reduction processing a plural times to reduce the number of pixels up to the second number of pixels. However, since a reduction rate of the one-time reduction processing becomes 50% or more, degradation of image quality such as the pixel omission due to reduction processing is suppressed. The intermediate reduction unit 28*c* can reduce the size of the first image to, for example, 1.5 to 1.7 times the size (the number of pixels) of the final image displayed in the display area of the display device 16. When the above-described intermediate image having the number of pixels that is larger than the final number of pixels of the final image is generated during the viewpoint converting process of the viewpoint converting unit 28*b*, the intermediate reduction unit 28*c* may be omitted.

Figure 4:
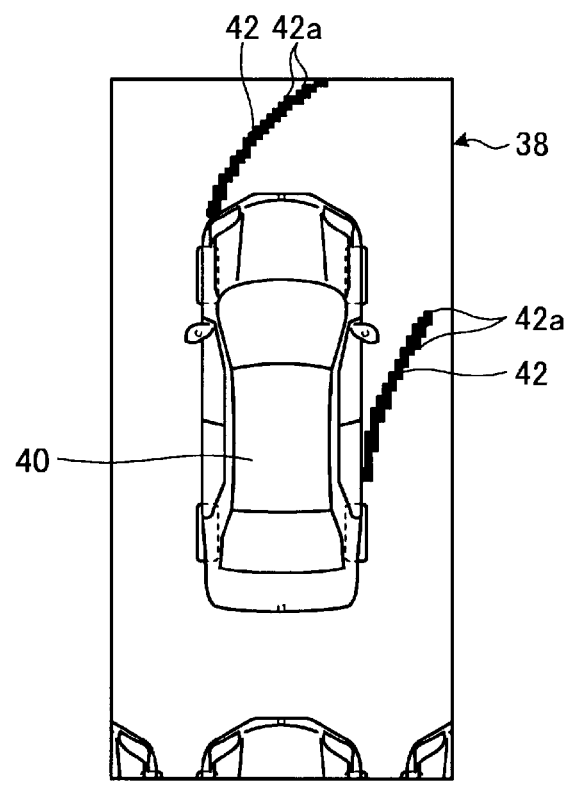
FIG. 4 is a schematic view illustrating a second image having an intermediate size in which an additional image is superimposed, which is an example of an image processed by the image processing device according to the embodiment.

The synthesis unit 28*d* joins the plurality of images, the viewpoints of which are converted by the viewpoint converting unit 28*b*, into one image. For example, FIG. 4 illustrates a schematic synthetic example of a second image 38 corresponding to the intermediate image. FIG. 4 is a bird's-eye view image centered on the vehicle 10. For example, the synthesis unit 28*d* joins a right end portion of the bird's-eye view image based on the captured image data of the image capturing unit 14*a* and a front end portion of the bird's-eye view image based on the captured image data of the image capturing unit 14*c*. Similarly, the synthesis unit 28*d* joins a left end portion of the bird's-eye view image based on the captured image data of the image capturing unit 14*a* and a front end portion of the bird's-eye view image based on the captured image data of the image capturing unit 14*d*. Further, the synthesis unit 28*d* joins a rear end portion of the bird's-eye view image based on the captured image data of the image capturing unit 14*d* and a left end portion of the bird's eye view image based on the captured image data of the image capturing unit 14*b*, and joins a right end portion of the bird's eye view image based on the captured image data of the image capturing unit 14*b* and a rear end portion of the bird's eye view image based on the captured image data of the image capturing unit 14*c*. Further, the synthesis unit 28*d* performs blending processing during the joining processes, and reduces occurrence of unnaturalness (a boundary line and the like) at the joined portions due to a difference between brightnesses and colors of the images. The synthesis unit 28*d* can change the synthesis form according to the display mode of the final image. For example, when the bird's-eye view image which is the final image is designed in a manner in which the bird's-eye view image does not include a rear area, the synthesis unit 28*d* synthesizes a three-sided bird's-eye view image using a front image by the image capturing unit 14*a* and lateral side images by the image capturing unit 14*c* and the image capturing unit 14*d*. Further, for example, when it is designated that the final image is displayed to face the vehicle 10 from the right side of the vehicle 10, the synthesis unit 28*d* sets an image using only the right image by the image capturing unit 14*c* as a synthesized image.

When an additional image is superimposed on the synthesized image synthesized by the synthesis unit 28*d*, the additional image acquiring unit 28*e* acquires the additional image from, for example, the ROM 24*b*, the SSD 24*f*, and the like. As illustrated in FIG. 4, the additional image includes, for example, an own vehicle icon 40 corresponding to the vehicle 10, movement prediction lines 42 of the wheels 12, and the like. Only a part of the vehicle 10 is reflected in the captured image data captured by each image capturing unit 14. For example, only a part of a front bumper 10*a* of the vehicle 10 is reflected in the captured image data of the image capturing unit 14*a*, and only a part of a rear bumper 10*b* of the vehicle 10 is reflected in the captured image data of the image capturing unit 14*b*. Further, only a lateral portion (a part of a door or the like) of the vehicle 10 is reflected in the captured image data of the image capturing units 14*c* and 14*d*. Therefore, even when the viewpoint converting process is performed based on the captured image data, the bird's-eye view image of the vehicle 10 cannot be configured. Therefore, the own vehicle icon 40 corresponding to the shape of the vehicle 10 is stored in the ROM 24*b* or the like in advance, and is read if necessary. Further, the movement prediction lines 42 are linear images of which the shapes (an extending direction) change according to an operation state (a steering direction) of a steering wheel of the vehicle 10. In addition, examples of the additional image include a vehicle width guide line image extending forward from an end portion of the vehicle 10, for example, an end portion of the front bumper 10*a*, a distance guide line image indicating a separation distance from the front bumper 10*a*, and the like. Similarly, examples of the additional image include a vehicle width guide line image extending rearward from the rear bumper 10*b* of the vehicle 10, a distance guide line image, and the like. In FIG. 4, the movement prediction lines 42 are displayed only for an outer front wheel and an inner rear wheel in a turning direction. However, the movement prediction lines 42 may be displayed for all the wheels. A shape based on a turning radius of the vehicle 10 is displayed as the movement prediction line 42 on the rear wheel side.

The superposition processing unit 28*f* superimposes the additional image acquired by the additional image acquiring unit 28*e* on the synthesized image (for example, the bird's-eye view image) synthesized by the synthesis unit 28*d*. For example, the own vehicle icon 40 is superimposed on a center of four joined bird's-eye images. Further, in the case of the movement prediction lines 42, the movement prediction lines 42 having a basic shape (a straight line shape) acquired from the ROM 24*b* are displayed while drawing states thereof are sequentially changed based on the turning radius of the vehicle 10 of which a posture is changed according to a steering amount of the steering wheel and steering of the steering wheel. Since the image such as the movement prediction lines 42 is configured with a plurality of dots, for example, as illustrated in FIG. 4, when a largely curved line as the movement prediction lines 42 is drawn, a plurality of dots 42*a* constituting the line are displayed while being slightly shifted from each other. That is, the movement prediction lines 42 are drawn as jagged lines (in the case of FIG. 4, for description, only the movement prediction lines 42 are exaggeratedly displayed to indicate jaggedness by the dots 42*a*). Although described below, jagged portions of the movement prediction lines 42 are blunted by the reduction processing in the final image generating unit 30, and thus become a line having a smooth outline, and display quality can be improved. The superposition processing unit 28*f* may change a display color of the additional image or perform blinking according to a state of a drawn additional image.

The intermediate image acquiring unit 30*a* of the final image generating unit 30 acquires the second image 38 (the intermediate image) generated by the intermediate image generating unit 28. Next, the final reduction unit 30*b* reduces the size (the second number of pixels) of the acquired second image 38 (performs a reduction process) such that the size (the second number of pixels) of the second image 38 becomes the size (the final number of pixels) of the final image to be displayed on the display area of the display device 16. Even in the case, although the final reduction unit 30*b* may perform a plurality of reduction processes to reduce the number of pixels to the final number of pixels, the reduction rate of the one-time reduction processing is set to 50% or more. In this case, the second image 38 acquired by the intermediate image acquiring unit 30*a* already has the same viewpoint as the viewpoint of the final image, the entire second image is uniformly and quickly reduced with a light load. That is, a degree of the reduction does not differ in part, and partial pixel omission does not occur. Therefore, degradation of the image quality due to the reduction can be suppressed.

Figure 5:
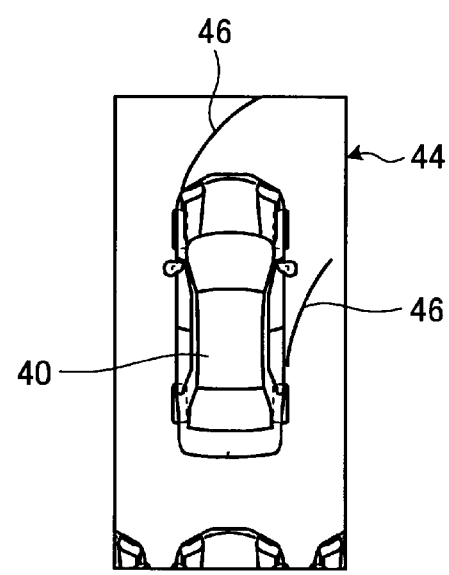
FIG. 5 is a schematic view illustrating a final image in which an additional image is superimposed, which is an example of an image processed by the image processing device according to the embodiment.

FIG. 5 is an example of an image processed by the image processing system 100, and illustrates a schematic display example of a final image 44. As described above, display contents of the final image 44 are the same as display contents of the second image 38 of FIG. 4 except for the size (the number of pixels). However, as the entire final image 44 is reduced by the final reduction unit 30*b*, the movement prediction lines 42 (the dots 42*a*) as the additional image shaky displayed in the second image 38 become movement prediction lines 46 having a blunted and smooth outer appearance. Similarly, even in the own vehicle icon 40 drawn in the final image 44, a line constituting the own vehicle icon 40 is displayed in a blunted and smooth state. As a result, the final image 44 becomes an image that is easy to see.

The first image acquiring unit 32*a* of the actual image processing unit 32 sequentially acquires the captured image data of each image capturing unit 14, which is obtained by the display control section 24*d*, as a first image. As described above, for example, the display control section 24*d* can capture an image in a state (an original image-quality state) in which the number of pixels of the captured image data captured by the image capturing units 14 is maintained or can capture an image while the number of pixels of the captured image data is sequentially reduced to a predetermined size. The first image acquiring unit 32*a* of the actual image processing unit 32 acquires a first image basically in a state in which the number of pixels of the captured image data when the image capturing units 14 perform the capturing is maintained, in order to display an actual image, that is, an image of which a viewpoint is not converted, on the in-vehicle display device 16, separately use the first image for pattern recognition, shape recognition, or the like, or perform separate image processing to display a processed image. Similarly to the first image acquiring unit 28a of the intermediate image generating unit 28, the first image acquiring unit 32a may acquire the first image which is reduction-processed appropriately in a range in which the reduction processing does not affect the image quality (in a range in which pixel omission does not occur).

The distortion correcting unit 32b corrects distortion of the first image acquired by the first image acquiring unit 32a. As described above, since the image capturing unit 14 includes a fish-eye lens and a wide angle lens to enable imaging in a wide range, a peripheral portion of the image based on the captured image data is largely curved. As a result, when the image is displayed on the display device 16 as it is, it is difficult to recognize a surrounding condition of the vehicle 10. Therefore, the distortion correcting unit 32b corrects distortion of a surrounding image and corrects the corrected image to an image that is easy to recognize.

The cutout processing unit 32c can appropriately cut a necessary portion according to each application, which belongs to the first image of which the distortion is corrected by the distortion correcting unit 32b. For example, when only an area close to a central portion of the front image captured by the image capturing unit 14a is displayed on the display device 16, or when the image of the vehicle 10 in the turning direction is displayed in a center of the display device 16, the corresponding area is cut out according to the size of the display area of the display device 16. Further, when a currently captured image is used in future, for example, when an image (a past image) such as a portion entering a bottom of the vehicle 10 is displayed as the vehicle 10 travels, the cutout processing unit 32c cuts out a portion to be used (a portion required in the future).

When the first image of which the distortion is corrected by the distortion correcting unit 32b and a part of the first image cut out by the cutout processing unit 32c are displayed on the display area of the display device 16, the actual image reducing unit 32d performs reduction processing in accordance with the size of the display area. Even in the case, when reducing the size of the image to the size of the display area of the display device 16, the actual image reducing unit 32d may perform the reduction processing a plural times. However, the reduction rate of the one-time reduction processing is 50% or more, so that degradation of the image quality due to the pixel omission can be suppressed.

The storage processing unit 32e temporarily stores the image processed by the distortion correcting unit 32b, the cutout processing unit 32c, and the like in the RAM 24c and the SSD 24f, and calls and uses the image if necessary. In this case, basically, the image can be stored before reduction or in a state of being minimally reduced. As a result, since image quality of an original image can be maintained and image processing and recognition processing can be performed in a state of good image quality at a later timing, high-quality display and highly accurate detection can be performed.

Figure 6:
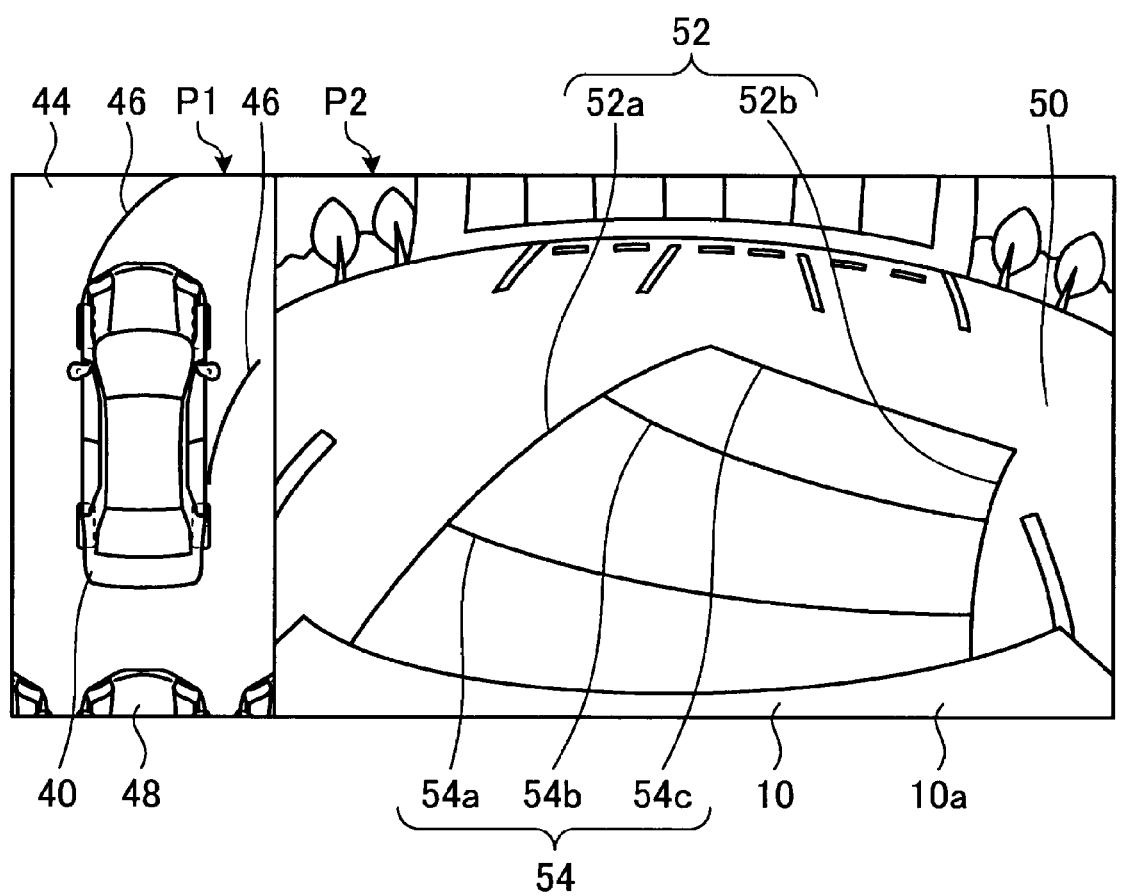
FIG. 6 is a schematic view illustrating an example of a display screen of a display device on which an image processed by the image processing apparatus according to the embodiment is displayed.

FIG. 6 is a schematic diagram illustrating an example of a display screen of the display device 16 on which an image processed by the image processing system 100 according to the embodiment is displayed. In the case of FIG. 6, the display area of the display device 16 is divided into two areas P1 and P2. The final image 44 (the bird's-eye view image) generated by the final image generating unit 30 is displayed on the area P1. As described above, the smooth movement prediction lines 46 extending from the own vehicle icon 40 are displayed on the final image 44. Further, another vehicle 48 captured by the image capturing unit 14d is displayed behind the own vehicle icon 40 in a bird's-eye viewed state in which a viewpoint thereof is converted. Further, for example, the front image based on the captured image data captured by the image capturing unit 14a as an actual image 50 generated by the actual image processing unit 32 is displayed on the area P2. In FIG. 6, the distortion correction by the distortion correcting unit 32b, the cutout processing by the cutout processing unit 32c, and the reduction processing by the actual image reducing unit 32d are performed on the captured image data (the first image) captured by the image capturing unit 14a, and a range that is considered necessary for minimum recognition when forward running is executed is mainly displayed in the area P2. A part of the front bumper 10a as the vehicle 10 is reflected at a lower end of the actual image 50 (on a near side when viewed from the driver) and is used as a display standard of the actual image 50.

Vehicle width guide line images 52, distance guide line images 54, and the like are superimposed and displayed in the actual image 50 illustrated in FIG. 6 as an index (a guide line) for supporting traveling of the vehicle 10. The vehicle width guide line images 52 are drawn such that a left side vehicle width guide line image 52a and a right side vehicle width guide line image 52b extend, for example, from the front bumper 10a to a position corresponding to 2.5 m in front so as to be in contact with a road surface. Further, the distance guide line images 54 are configured with a plurality of lines extending in the vehicle width direction to straddle the left side vehicle width guide line image 52a and the right side vehicle width guide line image 52b. The distance guide line images 54 include, for example, a first distance guide line image 54a illustrating the front side of the front bumper 10a of the vehicle 10, for example, a position of 0.5 m, a second distance guide line image 54b illustrating a position of 1.0 m, and a third distance guide line image 54c illustrating a position of 2.5 m. The number of the distance guide line images 54 is not limited to three, and may increase/decrease according to setting of the driver. An interval between the distance guide line image 54 may also be set appropriately. Drawing positions (directions) of the vehicle width guide line images 52 and the distance guide line images 54 can be changed according to a steering state (a steering state and a steering angle state of the front wheels 12F) of the steering wheel of the vehicle 10. A state in which the steering wheel is steered from a neutral point to a right point is illustrated in FIG. 6 as an example.

In this way, even when the viewpoint conversion is performed and the size is reduced to the optimum size for the display area of the display device 16, in the image processing system 100 according to the present embodiment the second image 38 having the second number of pixels that is larger than the final number of pixels at the same viewpoint as the final image 44 is generated. As a result, in the step of generating the second image 38, an extreme reduction of 50% or less is suppressed and it becomes easy to eliminate cause of the degradation of the image quality such as the pixel omission. Further, the entire image is reduced from this state to the final number of pixels of the final image 44. In this case, the reduction rate is set not to be 50% or less. As a result, the degradation of the image quality of the final image 44 due to the pixel omission can be suppressed. Further, when reducing to the size of the final image 44, the second image 38 at the same view point as the final image 44 can be uniformly and quickly reduced with a light load. Therefore, the image captured by the image capturing units 14 is more quickly processed with a light load using a limited processing capability of an in-vehicle device, so that a reduced image having high quality can be provided.

In FIG. 6, as an example, an area ratio of the area P1 (a display area of the final image 44) and the area P2 (a display area of the actual image 50) is set to about 1:3. However, the area ratio may be changed by operating the operation inputting unit 20 or the like. For example, the area P1 for displaying the final image 44 may be larger than the area P2 for displaying the actual image 50 or may be equally divided. Further, either the final image 44 or the actual image 50 may be displayed. When the size of the area P1 is changed, for example, it is possible to cope with the change by changing the reduction ratio in the final reduction unit 30b or changing the number of times of the reduction at the reduction ratio of 50% or more according to the size of the area P1. Similarly, when the size of the area P2 is changed, for example, it is possible to cope with the change by changing the reduction ratio in the actual image reducing unit 32d or changing the number of times of the reduction at the reduction ratio of 50% or more according to the size of the area P2.

Although a state in which additional images such as the movement prediction lines 46, the vehicle width guide line images 52, and the distance guide line images 54 are superimposed on each other is illustrated in FIG. 6, presence/absence of the superimposition and contents of the superimposition may be changed by operating the operation inputting unit 20. Further, FIG. 6 illustrates a display example of a state in which the vehicle 10 can move forward (for example, a state in which a shift position belongs to a "D range"). In a state in which the vehicle 10 can move rearward (for example, a state in which the shift position belongs to an "R range"), the additional images such as the movement prediction lines 46, the vehicle width guide line images 52, and the distance guide line images 54 are drawn based on the rear wheels 12R and the rear bumper 10b. The switching may be automatically performed according to an operation of a shift operating unit.

A program for image processing executed by the CPU 24a of the present embodiment may be provided such that the program is recorded in an installable format file or an executable format file in a computer-readable recording medium such as a CD-ROM, a flexible disk (FD), a CD-R, and a Digital Versatile Disk (DVD).

Further, the image processing program may be stored in a computer connected to a network such as the Internet and may be provided by being downloaded via the network. Further, the image processing program executed in the present embodiment may be provided or distributed via the network such as the Internet.

An image processing device according to an embodiment of this disclosure includes an acquisition unit that acquires a first image based on captured image data output from an image capturing unit that captures a surrounding situation of a vehicle, an intermediate image generating unit that generates a second image by executing an intermediate image generating process of executing a viewpoint converting process of converting the first image from a viewpoint of the first image into a viewpoint of a final image displayed on a display device of a display device and changing a number of pixels of the converted image to a second number of pixels that is larger than a final number of pixels of the final image, and a final image generating unit that executes a reduction process such that the second number of pixels of the second image is set to the final number of pixels of the final image. For example, when the viewpoint converting process is performed on an image captured by the image capturing unit, a reduction rate of a portion close to the image capturing unit tends to be smaller than a portion far from the image capturing unit. However, with this configuration, for example, a second image having the second number of pixels that is larger than the final number of pixels of the final image displayed on the display device is generated in a step of applying the viewpoint converting process. That is, since the viewpoint conversion is performed in a step in which a reduction ratio is high and the size (the number of pixels) is relatively large, it is difficult for an excessively reduced portion (for example, a pixel omitted portion) inside the image to occur. Further, in this state, since the number of pixels is reduced to the final number of pixels, the entire second image can be quickly and uniformly reduced with a light load, so that partial variations in image quality are suppressed, and the final image having reduced degradation of image quality and suitable for display can be generated.

In the embodiment of this disclosure, the acquisition unit of the image processing device may acquire a plurality of the first images based on the captured image data output from a plurality of the image capturing units that capture surrounding situations of the vehicle, and the intermediate image generating unit may generate a synthesized image as the second image by joining images obtained by executing the viewpoint converting process on the plurality of first images to one another. With this configuration, for example, in a step of the second image having an intermediate size and not affected by pixel omission by reduction, a synthesized image of the same viewpoint as the final image is generated and is reduced to the final image. As a result, the degradation of the image quality of the final image which is the synthesized image is reduced, so that an image that is easy to see can be displayed.

In the embodiment of this disclosure, the intermediate image generating unit of the image processing device may, for example, generate the second image on which an additional image is superimposed. With this configuration, for example, since a step difference (rattling of a connection portion of dots when a curved line or the like is drawn) between dots of the additional image (for example, a diagram or the like) superimposed in a step in which the number of pixels is large, the entire additional image becomes smooth. As a result, unnaturalness of the additional image in the final image can be alleviated and an image that is easy to see can be generated.

In the embodiment of this disclosure, the final image generating unit may perform a reduction processes at a reduction rate of 50% or more a plural times, when the second number of pixels of the second image is reduced to the final number of pixels.

Although embodiments and variations of this disclosure are presented as an example and are not intended to limit the scope of the invention. These novel embodiments can be implemented in various other forms, and various omissions, substitutions, and changes thereof can be made without departing from the spirit of the invention. These embodiments and modifications thereof are included in the scope and gist of the invention and are included in the invention described in the appended claims and the equivalent scope thereof.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An image processing device comprising:
   an acquisition unit that acquires a first image based on captured image data output from an image capturing unit that captures a surrounding situation of a vehicle;
   a viewpoint converting unit that generates process of executing a viewpoint converting process of converting the first image from a viewpoint of the first image into a viewpoint of a final image displayed on a display area of a display device;
   an intermediate reduction unit that performs reduction processing to an image to a number of pixels of that is a second number of pixels larger than a final number of pixels of the final image;
   an intermediate image generating unit that generates a second image by processing the first image using the viewpoint converting unit and reducing the number of pixels of the first image using the intermediate reduction unit to change a number of pixels of the converted image to a second number of pixels; and
   a final image generating unit that executes a reduction process such that the second number of pixels of the second image is set to the final number of pixels of the final image.

2. The image processing device according to claim 1, wherein the acquisition unit acquires a plurality of the first images based on the captured image data output from a plurality of the image capturing units that capture surrounding situations of the vehicle, and
   the intermediate image generating unit generates a synthesized image as the second image by joining images obtained by executing the viewpoint converting process on the plurality of first images to one another.

3. The image processing device according to claim 1, wherein the intermediate image generating unit generates the second image on which an additional image is superimposed.

4. The image processing device according to claim 1, wherein the final image generating unit performs a reduction processes at a reduction rate of 50% or more a plural times, when the second number of pixels of the second image is reduced to the final number of pixels.

* * * * *